United States Patent
Mao et al.

(10) Patent No.: US 10,198,262 B2
(45) Date of Patent: Feb. 5, 2019

(54) ADAPTIVE CORE GROUPING

(71) Applicant: SonicWALL US Holdings Inc., Milpitas, CA (US)

(72) Inventors: Miao Mao, Shanghai (CN); Zhong Chen, San Jose, CA (US); John Gmuender, San Jose, CA (US)

(73) Assignee: SONICWALL INC., Milpitas, CA (US)

( * ) Notice: Subject to any disclaimer, the term of this patent is extended or adjusted under 35 U.S.C. 154(b) by 90 days.

(21) Appl. No.: 14/819,403

(22) Filed: Aug. 5, 2015

(65) Prior Publication Data

US 2017/0039069 A1 Feb. 9, 2017

(51) Int. Cl.
*G06F 9/30* (2018.01)
*G06F 12/0875* (2016.01)

(52) U.S. Cl.
CPC ...... *G06F 9/30145* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 7,990,974 B1* | 8/2011 | Gmuender | ............ | G06F 9/5044 370/230 |
| 2006/0236323 A1* | 10/2006 | Neill | ............ | G06F 9/5072 718/104 |
| 2010/0281285 A1* | 11/2010 | Blanding | ............ | G06F 9/5027 713/324 |
| 2014/0108729 A1* | 4/2014 | Avudaiyappan | ..... | G06F 9/30043 711/122 |
| 2014/0196050 A1* | 7/2014 | Yu | ............ | G06F 9/5088 718/104 |
| 2014/0337849 A1* | 11/2014 | Seo | ............ | G06F 9/46 718/102 |
| 2015/0261567 A1* | 9/2015 | Kim | ............ | G06F 9/5027 718/104 |
| 2017/0024316 A1* | 1/2017 | Park | ............ | G06F 9/46 |

* cited by examiner

*Primary Examiner* — Wynuel S Aquino
(74) *Attorney, Agent, or Firm* — Polsinelli LLP (57) ABSTRACT

The present invention relates to a system, method, and non-transitory storage medium executable by one or more processors at a multi-processor system that improves load monitoring and processor-core assignments as compared to conventional approaches. A method consistent with the present invention includes a first data packet being received at a multi-processor system. After the first packet is received it may be sent to a first processor where the first processor identifies a first processing task associated with the first data packet. The first data packet may then be forwarded to a second processor that is optimized for processing the first processing task of the first data packet. The second processor may then process the first processing task of the first data packet. Program code associated with the first processing task may be stored in a level one (L1) cache at the first processor.

20 Claims, 4 Drawing Sheets

ADAPTIVE CORE GROUPING

BACKGROUND OF THE INVENTION

Field of the Invention

The present invention is generally related to processing packets of data. More specifically the present invention is related to optimizing the performance of processing a plurality of data packets.

Description of the Related Art

Computer systems commonly process packets that may be received over a computer network. When packets are received at a computer system that includes a multi-core processor the packets are typically assigned to a processing core at the multi-core processor randomly for processing. In certain instances each processing core of a multi-core processor accesses a private or semi-private level 1 (L1) cache when processing packets.

When the L1 cache of a processor does not contain instructions that enable it to process a packet (a cache miss), that processor will typically access a level 2 (L2) cache or another memory to fetch program code required to process the packet. Since the L1 cache is significantly faster than an L2 cache or other memory, the processing of packets slows down as soon as a processor identifies that it must access the L2 cache or other memory. Conventional multi-core processing systems frequently will share an L2 cache or other memories with a plurality of processor at the multi-core processing system.

Since a processor accessing program code from an L2 cache or other memory is slow, the performance of a multi-core processing system slows down whenever a processor access the L2 cache or other memory as compared to the instance where the processor need only access an L1 cache that is associated with the processor. Frequently memories contained within an L1 cache are expensive because they are often very high speed memories. Since L1 caches commonly include expensive memories the amount (i.e. size/storage capacity) of the L1 cache is frequently limited.

What is needed to maximize the performance of a processing core processing packets is a system and a method by which a processor may access its associated local L1 cache with an increased cache hit rate.

SUMMARY OF THE PRESENTLY CLAIMED INVENTION

The presently claimed invention relates to a system and method for efficiently processing data packets in a multi-processor system. A method consistent with the presently claimed invention includes a first data packet being received at a multi-processor system. After the first packet is received it may be sent to a first processor where the first processor identifies a first processing task associated with the first data packet. The first data packet may then be forwarded to a second processor that is optimized for processing the first processing task of the first data packet. The second processor may then process the first processing task of the first data packet. Program code associated with the first processing task may be stored in a level one (L1) cache at the first processor.

The method of the presently claimed invention may be implemented using a non-transitory data storage medium. In this instance a software program operating on the multi-processor system may receive a first data packet. After the first packet is received it may be sent to a first processor where the first processor identifies a first processing task associated with the first data packet. The first data packet may then be forwarded to a second processor that is optimized for processing the first processing task of the first data packet. The second processor may then process the first processing task of the first data packet. Program code associated with the first processing task may be stored in a level one (L1) cache at the first processor.

A system consistent with the present invention may include one or more processors at a multi-processor system. The multi-processor system may receive a first data packet. After the first packet is received it may be sent to a first processor where the first processor identifies a first processing task associated with the first data packet. The first data packet may then be forwarded to a second processor that is optimized for processing the first processing task of the first data packet. The second processor may then process the first processing task of the first data packet. Program code associated with the first processing task may be stored in a level one (L1) cache at the first processor.

DETAILED DESCRIPTION

The present invention relates to a system, method, and non-transitory storage medium executable by one or more processors at a multi-processor system. The multi-processor system may be optimized for efficiently processing data packets. A method consistent with the present invention includes a first data packet being received at a multi-processor system. After the first packet is received it may be sent to a first processor where the first processor identifies a first processing task associated with the first data packet. The first data packet may then be forwarded to a second processor that is optimized for processing the first processing task of the first data packet. The second processor may then process the first processing task of the first data packet. Program code associated with the first processing task may be stored in a level one (L1) cache at the first processor.

Figure 1:
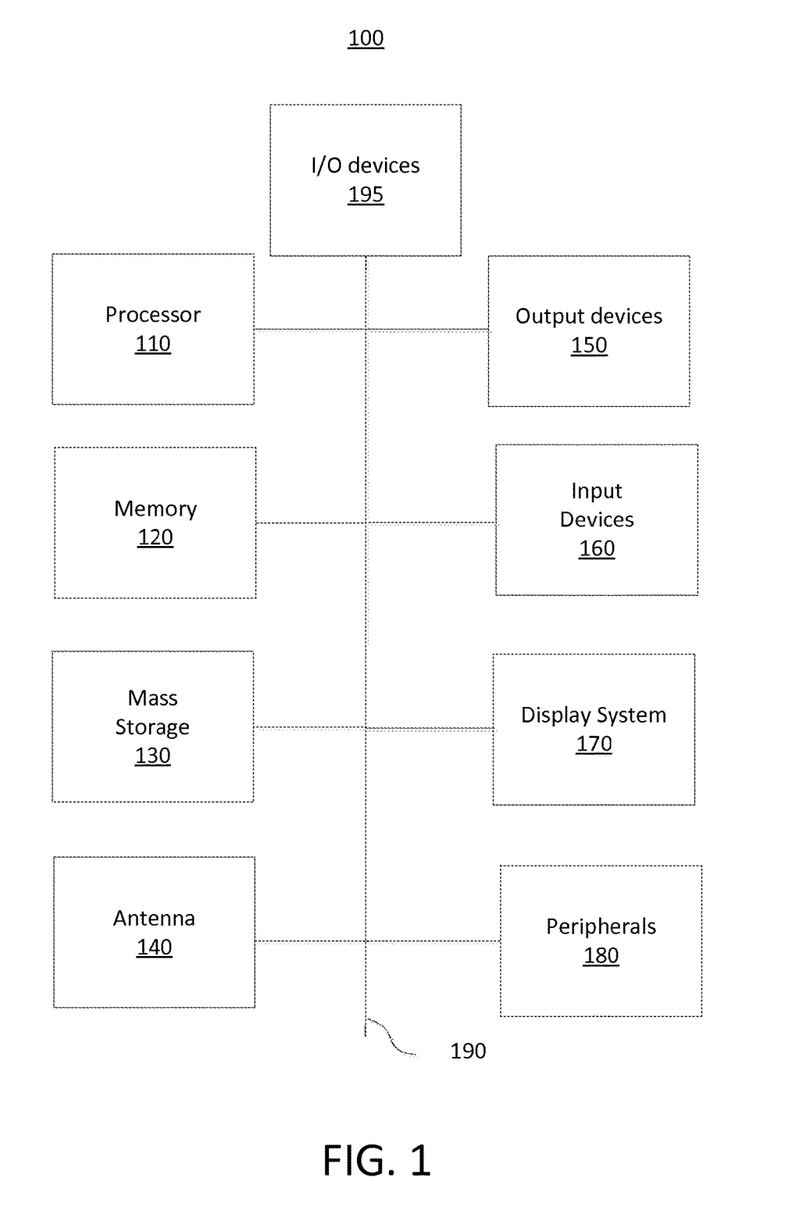
FIG. 1 illustrates a block diagram of a computing device that may be used to implement various embodiments of the present invention.

FIG. 1 illustrates a block diagram of a computing device that may be used to implement various embodiments of the present invention. FIG. 1 illustrates an exemplary computing system 100 that may be used to implement a computing device with the present technology. Note that FIG. 1 is exemplary and that all features shown in the figure may not be included in a system implementing the present invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the present invention for purposes of loading that software into main memory 120. The system software for implementing embodiments of the present invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the present invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the present invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

Figure 2:
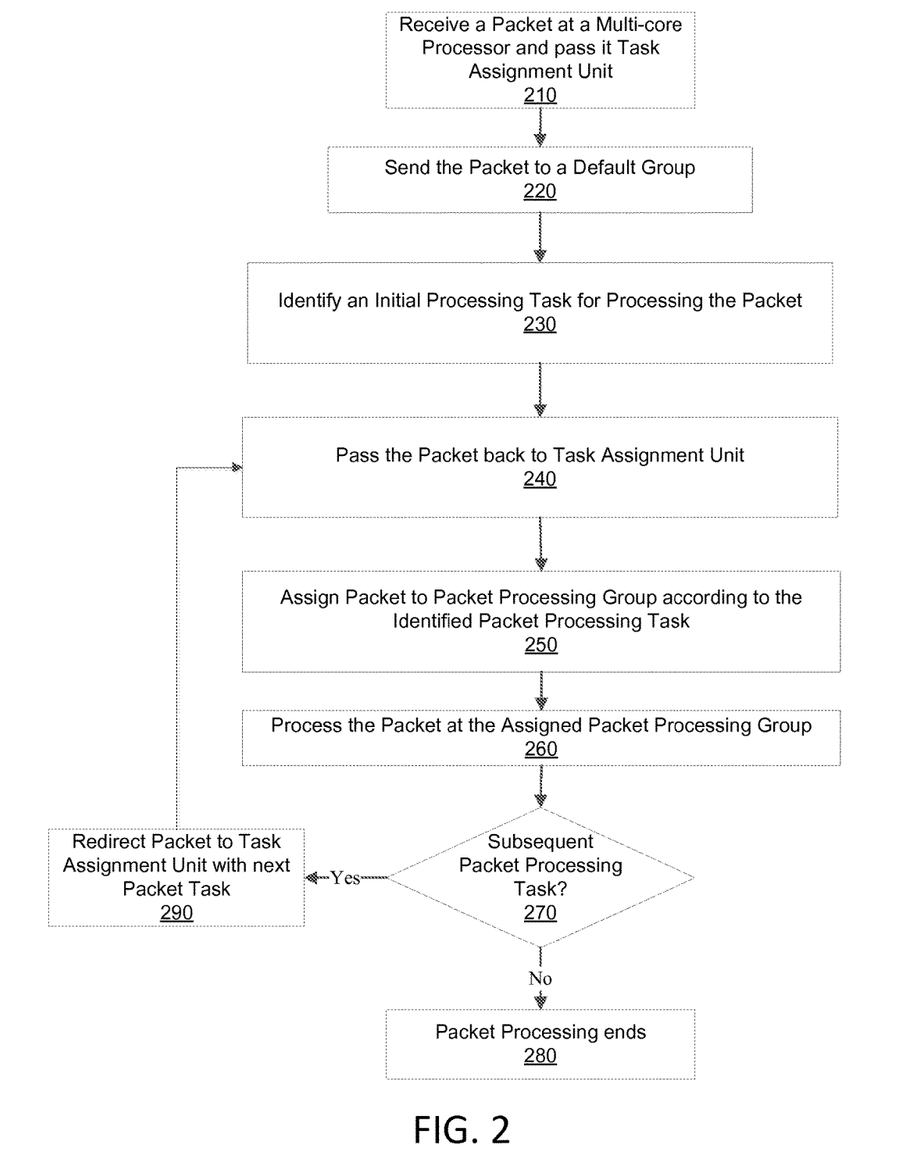
FIG. 2 illustrates an exemplary method consistent with the presently disclosed invention

FIG. 2 illustrates an exemplary method consistent with the presently disclosed invention. FIG. 2 is a flow chart that may be implemented by a set of multi-core processors executing program code out of memories in a multi-processor system. Step 210 of FIG. 2 is where a packet may be received at a processor in a multi-core processor. Step 210 may be executed by a task assignment unit at the multi-core processor.

After the packet is received, the packet may be sent to a processor at the multi-core processor that executes program code that may be associated with a default group in step 220. The processor executing the default group program code may then identify an initial processing task for processing the packet in step 230 of the flow chart.

Next in step 240, FIG. 2 illustrates the packet being passed back to the task assignment unit. After step 240 the packet may be assigned to a (first) packet processing group in step 250 of the flow chart. Optimally the (first) packet processing group includes program code that is optimized for processing the processing task that was identified in step 240 of the flow chart. Then in step 260 the (first) packed processing group processes at least a portion of the packet. The (first) packet processing group may be a processor in a multi-processor system that stores program code associated with the identified processing task in an L1 cache at that specific processor.

Program code stored in an L1 cache at a particular processor may be optimized to process one or more types of packet processing tasks or for processing one or more types of packets. One main consideration for optimizing the code stored in an L1 cache at a particular processor may relate to the amount of code required to process one or more types of packet processing tasks as compared to the size of the L1 cache that is available for storing program code. Another consideration for optimizing the code stored in an L1 cache at a particular processor may be the likelihood relating to whether a packet will frequently require processing by two specific types of packet processing tasks. In the instance where a stream of packets frequently contain two different sequential types of processing tasks, a particular processor may be optimized to process those two different tasks. In such an instance the processor could process the two different tasks sequentially. In certain instances a particular processor may be configured to process two or more types of packet processing tasks in other instances a particular processor may only process one type of packet processing task.

Step 270 of the flow chart of FIG. 2 is a determination step that determines whether the packet requires subsequent processing, when no the processing of the packet ends at step 280 of the flow chart.

When determination step 270 identifies that the packet requires subsequent processing program flow moves to step 290 where the packet may be assigned to a (second) packet processing group either directly or through the task assignment unit. The (second) packet processing group assigned to perform subsequent processing of the packet will usually be optimized to process different processing tasks than the (first) packet processing group. The first and the second processing group may be associated with a first processor and with a second processor respectively. The first processor may store program code in its associated L1 cache that is optimized for processing a first packet processing task type, where the second processor may store program code in its associated L1 cache that is optimized for processing a second type of packet processing task.

When a received transfer control protocol (TCP) packet corresponds to a type "A" packet and when a type "A" packet includes tasks A0, A1, A2, and A3, the packet may be assigned to a processor optimized for processing each subsequent packet task A0, A1, A2, and A3. In such an instance:

Packet Task A0 may be associated with initializing packet information, retrieving source/destination IP address, identifying an IP protocol, and identifying source/destination Port (5 tuple information).

Packet Task A1 may use the 5 tuple information to lookup flow cache when identifying an access rule, an NAT rule, or a routing entry.

Packet Task A2 may perform advanced firewall scanning such as performing an anti-virus scan, intrusion prevention detection, and an anti-spyware function.

Packet Task A3 may forward the packet to an identified destination and the packet may be forwarded based on a packet task definition. A pipeline flow for processing a TCP (type A) packet may be: core group #1 processing packet task A0, core group #2 processing packet task A1, core group #3 processing packet task A2, and core group #4 processing packet task A3.

Figure 3:
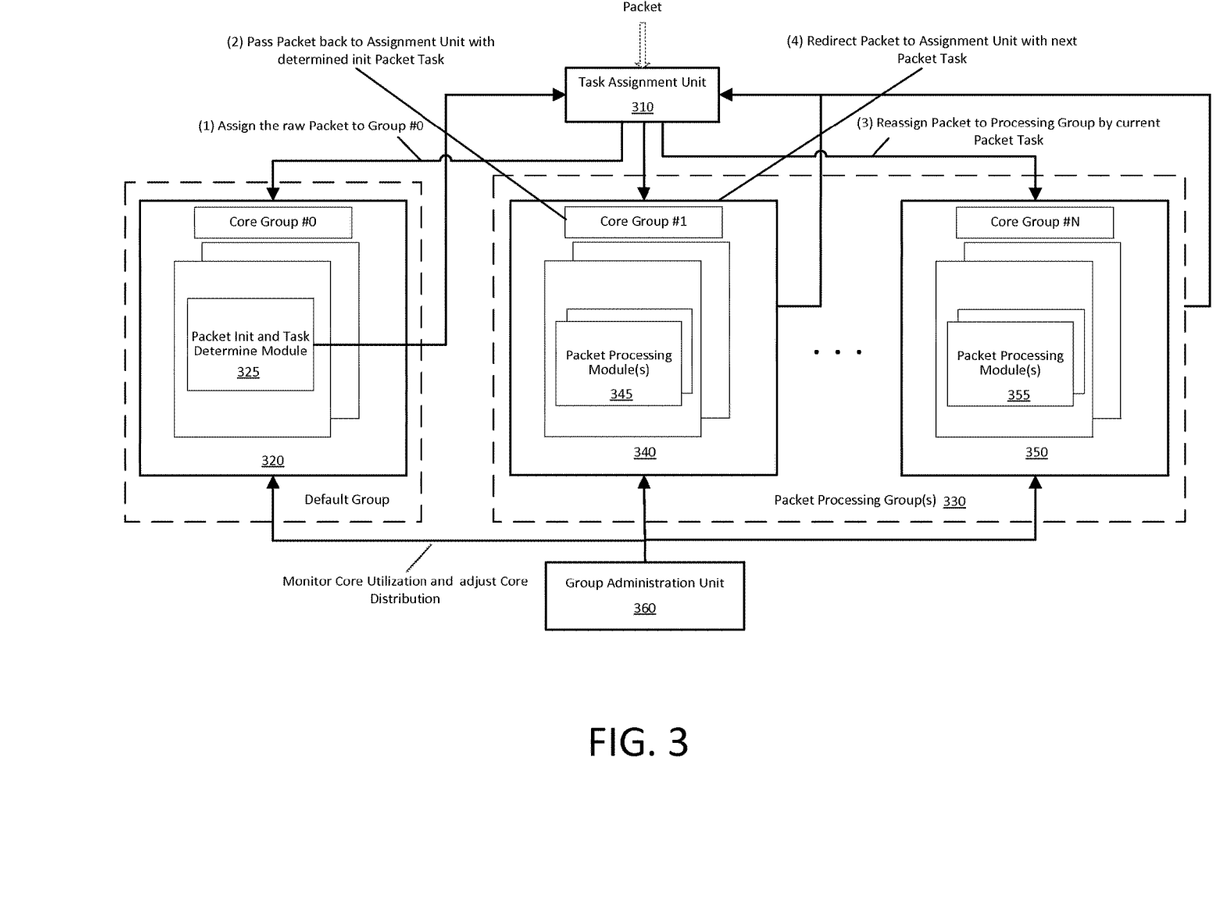
FIG. 3 illustrates various components that may implement a method consistent with the presently described invention.

FIG. 3 illustrates various components that may implement a method consistent with the presently described invention. FIG. 3 includes a task assignment unit 310, a core group #0, a core group #1, a core group #N, and a group administration unit 360. Core group #0 may be associated with a first processor 320 of a multi-processor system that includes a packet initialization and task determination software module 325. The multi-processor system of FIG. 3 includes a plurality of packet processing groups 330 including core group #1 through core group #N. Each of core groups #1 through core group #N may be associated with a processor of the multi-processor system where each core group is optimized to process packets of one or more specific types of packet processing tasks or types of packets. Core group #1 may be associated with a second processor 340 of the multi-processor system that includes a packet processing module 345. Core group #N may be associated with a third processor 350 of the multi-processor system that includes a packet processing module 355. While the present description of FIG. 3 reviews the actions of a first processor, a second processor, and a third processor, embodiments of the present invention may assign multiple processors (i.e. a processor set) to a core group.

The multi-processor system of FIG. 3 may first receive a packet at the task assignment unit 310, the task assignment unit may send (assign) the packet to core group #0 for initial processing; i.e. task (1) in FIG. 3 where the raw packet is assigned to group #0. The processor 320 at Core group #0 may review information in the packet when identifying what type of processing the packet requires. After the processor 320 at core group #0 identifies a type of processing that the packet requires, the packet may be passed back to the task assignment unit 310, as illustrated in by task (2) in FIG. 3 (pass packet back to the assignment unit with a determined packet task). Next the packet may be assigned to a core group that is optimized for processing the packet, as illustrated by task (3) of FIG. 3. For example, the task assignment unit 310 may first assign and then pass the packet to core group #1 for processing by processor 340.

After at least one phase (stage) of the packet is processed at core group #1, the packet may be passed back to the task assignment unit 310 when the packet requires additional processing. The task assignment unit may then assign the packet to core group #N when the L1 cache of processor 350 includes code that is configured to process the next processing task of the packet. An individual packet may be passed to a different processing core whenever an L1 cache at a current processing core that is currently processing the packet does not include code capable of processing a next processing task of the packet. FIG. 3 also illustrates (task (4)) where the packet is sent back to the task assignment unit when the packet requires processing by yet another processor.

The group administration unit 360 may monitor the workload of each processing core of the multi-core processing system. Workloads may be monitored by a measure of utilization of a processor. Utilization may be monitored by a % utility of a processor or may be monitored by counting a number of packets currently assigned to a processing core. The % utility of the processor may correspond to a measure of processing cycles consumed as compared to a measure of processing cycles available at a processor.

When one processing core has a greater measure of utilization than a second processing core, a third processing core may be assigned by the group administration unit 360 to process the type of packet data that the first processing core is assigned to process. When a new processing core is assigned by the group administration unit 360, program code associated with processing a particular type of packet may be moved to the L1 cache of the new processing core. Program code monitoring the utilization of a plurality of processors in the multi-processor system may identify that a first processor in the multi-processor system is operating above a threshold level of utilization and then another processing core may be assigned to process the type of packet data that the first processing core is assigned to process. To accomplish this, a processor that is currently processing a different type of packet data or a processor that is un-assigned may be assigned to process types of processing tasks that are assigned to the first processor. Thus, when a specific type of processing task currently has a large amount of use, additional processing resources may be dynamically configured such that more than one processor shares the workload of processing that specific type of packet processing task.

Figure 4:
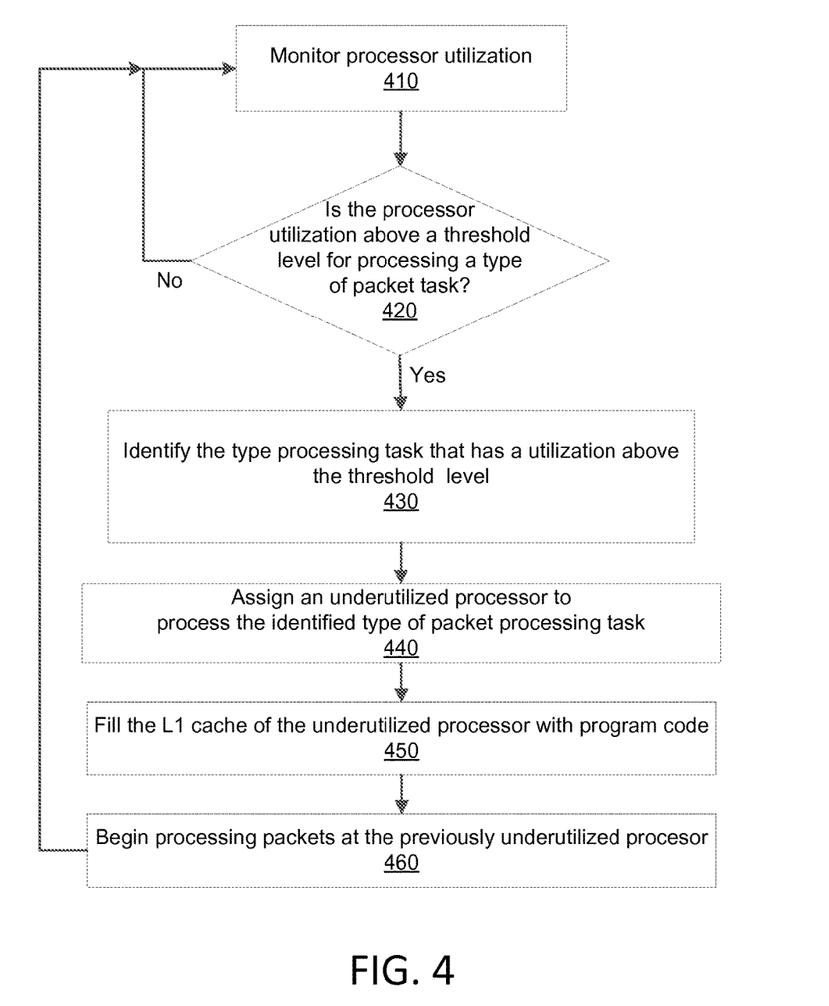
FIG. 4 illustrates an exemplary method for assigning underutilized processors in a multi-processor system to process types of packet tasks that are associated with a high processor utilization level.

FIG. 4 illustrates an exemplary method for assigning underutilized processors in a multi-processor system to process types of packet tasks that are associated with a high processor utilization level. Step 410 of FIG. 4 monitors the utilization of processors in the multi-processor system. Information associated with processor utilization levels may be stored in memory accessible by a group administration unit, such as the group administration unit 360 of FIG. 3. Step 420 is a determination step that identifies whether a processor utilization associated with a type of processing task is currently above a threshold level, when no program flow moves back to step 410 where processor utilization is monitored.

When a utilization level of a processor associated with processing a certain type of packet processing task is above a utilization threshold level, program flow moves from step 420 to step 430 where a particular type of processing task that is currently above the utilization threshold level is identified. In step 440 the group administration unit may assign an underutilized processor in the multi-processor system to process the type of packet processing task that is currently above the utilization threshold level. Then in step 450 the group administration unit may fill at least a portion of the L1 cache of the underutilized processor with program code associated with processing the type of packet task that is currently above the threshold level. Next FIG. 4 illustrates program flow moving to step 460 where the previously underutilized processor may begin processing the type of packet task that was identified in step 430 as being above a threshold level. Program flow then moves back to step 410 where processor utilization is monitored.

The group administration unit may also de-allocate (un-assign) a processor when the utilization of two or more processors processing a particular type of processing reduces below a combined threshold level. For Example, when two processors are currently processing task type "B" and the processor utilization of a first processor processing task type "B" is 30% and the processor utilization of a second processor processing task type "B" is 20%, the second processor may be de-allocated such that the first processor will be 50% utilized.

Experimental validations of embodiments of the present invention have demonstrated nearly a 100% increase in processing efficiency (i.e. in throughput measurable in input/outputs per second or in the number of packets processed over time) as compared to multi-processor systems that randomly assign packet processing tasks to processors in a multi-processor system.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for optimizing performance of processing packets, the method comprising:
   storing a first set of program code in a first level 1 (L1) cache that is private to a first processor of a multi-processor system, the first set of program code including instructions for assigning packet processing tasks to one or more other processors of the multi-processor system based on a type of program code stored in respective private L1 caches of each of the one or more other processors;
   assigning, by the first processor of the multi-processor system executing the first set of program code stored in the first private L1 cache, one or more packet processing tasks of a plurality of different processing tasks to the one or more other processors, wherein assigning the packet processing tasks includes assigning a second processor of the multi-processor system to process a first type of the plurality of different packet processing tasks, the second processor comprises a second L1 cache that is private to the second processor, and the second private L1 cache storing a second set of program code executable to process the first type of packet processing task;
   receiving a first data packet at the first processor, wherein the first data packet is associated with the first type of packet processing task;
   executing instructions out of the first private L1 cache of the first processor, wherein execution of the first private L1 cache instructions by the first processor assigns the second processor to begin processing the first data packet received at the multi-processor system, the assignment to the second processor based on the first data packet being associated with the first type of packet processing task and based on the second processor having been assigned to process the first type of packet processing task;
   forwarding the first data packet to the second processor assigned to process the first type of packet processing task; and
   executing instructions out of the second private L1 cache of the second processor, wherein execution of the second private L1 cache instructions by the second processor processes the first type of packet processing task associated with the first data packet.

2. The method of claim 1, further comprising:
   identifying that the first data packet is further associated with a second type of packet processing task;
   forwarding the first data packet to a third processor of the multi-processor system assigned to process the second type of packet processing task; and
   executing instructions out of a third private L1 cache at the third processor, wherein execution of the third private L1 cache instructions by the third processor processes the second type of packet processing task associated with the first data packet.

3. The method of claim 2, further comprising:
   identifying that the first data packet is further associated with a third type of packet processing task;
   forwarding the first data packet to a fourth processor of the multi-processor system assigned to process the third type of packet processing task; and
   executing instructions out of a fourth private L1 cache at the fourth processor, wherein execution of the fourth private L1 cache instructions by the fourth processor processes the third type of packet processing task associated with the first data packet.

4. The method of claim 1, further comprising:
   receiving a second data packet at the first processor of the multi-processor system;
   identifying that the second data packet is associated with the first type of packet processing task;
   forwarding the second data packet to the second processor of the multi-processor system assigned to process the first type of packet processing task;
   executing instructions out of the second private L1 cache at the second processor, wherein execution of the second private L1 cache instructions by the second processor processes the first processing task associated with the second data packet;
   identifying that the second data packet is further associated with a second type of packet processing task;
   forwarding the second data packet to a third processor of the multi-processor system assigned to process the second type of packet processing task; and
   executing instructions out of a third private L1 cache at the third processor, wherein execution of the third private L1 cache instructions by the third processor processes the second processing task associated with the second data packet.

5. The method of claim 1, further comprising:
monitoring a packet processing utilization level of each processor at the multi-processor system;
identifying that the packet processing utilization level of an identified processor at the multi-processor system exceeds a packet processing threshold utilization level;
identifying a packet processing task associated with the identified processor;
assigning a third processor in the multi-processor system to process the identified packet processing task associated with the identified processor; and
filling at least a portion of a third private L1 cache at the third processor with program code, wherein the program code filling the at least portion of the third private L1 cache at the third processor includes instructions executable to process the identified packet processing task.

6. The method of claim 5, further comprising:
identifying that a combined packet processing utilization level of the identified processor and the third processor is below a combined packet processing utilization threshold level; and
de-allocating the identified processor or the third processor from processing the identified packet processing task.

7. The method of claim 2, further comprising:
associating the third processor of the multi-processor system with processing the second type of packet processing task;
filling at least a portion of the second private L1 cache of the second processor with program code, wherein the program code filling the at least portion to the second private L1 cache of the second processor includes instructions executable to process the first type of packet processing task; and
filling at least a portion of the third private L1 cache of the third processor with program code, wherein the program code filling the at least portion to the third private L1 cache of the third processor includes instructions executable to process the second type of packet processing task.

8. A non-transitory computer-readable storage medium having embodied thereon a program executable by a processor to perform a method for optimizing performance of processing packets, the method comprising:
storing a first set of program code in a first level 1 (L1) cache that is private to a first processor of a multi-processor system, the first set of program code including instructions for assigning packet processing tasks to one or more other processors of the multi-processor system based on a type of program code stored in respective private L1 caches of each of the one or more other processors;
assigning, by the first processor of the multi-processor system executing the first set of program code stored in the first private L1 cache, one or more packet processing tasks of a plurality of processing tasks to the one or more other, wherein assigning the packet processing tasks includes assigning a second processor of the multi-processor system to process a first type of the plurality of different packet processing tasks, the second processor comprises a second L1 cache that is private to the second processor, and the second private L1 cache storing a second set of program code executable to process the first type of packet processing task;
receiving a first data packet at the first processor, wherein the first data packet is associated with the first type of packet processing task;
executing instructions out of the first private L1 cache at the first processor, wherein execution of the first private L1 cache instructions by the first processor assigns the second processor to begin processing the first data packet received at the multi-processor system, the assignment to the second processor based on the first data packet being associated with the first type of packet processing task and based on the second processor having been assigned to process the first type of packet processing task;
forwarding the first data packet to the second processor assigned to process the first type of processing task; and
executing instructions out of the second private L1 cache at the second processor, wherein execution of the second private L1 cache instructions by the second processor processes the first type of packet processing task associated with the first data packet.

9. The non-transitory computer-readable storage medium of claim 8, wherein the program comprises further instructions executable to:
identify that the first data packet is further associated with a second type of packet processing task;
forward the first data packet to a third processor of the multi-processor system assigned to process the second type processing task; and
process the second type of packet processing task at the third processor by executing instructions out of a third private L1 cache at the third processor.

10. The non-transitory computer-readable storage medium of claim 8, wherein the program comprises further instructions executable to:
identify that the first data packet is further associated with a third type of packet processing task;
forward the first data packet to a fourth processor of the multi-processor system assigned to process the third type of packet processing task; and
process the third type of packet processing task at the fourth processor by executing instructions out of a fourth private L1 cache at the fourth processor.

11. The non-transitory computer-readable storage medium of claim 8, wherein the program comprises further instructions executable to:
receive a second data packet at the first processor of the multi-processor system;
identify that the second data packet is associated with the first type of packet processing task;
forward the second data packet to the second processor of the multi-processor system assigned to process the first type of processing task;
process the first type of processing task at the second processor by executing instructions out of the second private L1 cache at the second processor;
identify that the second data packet is further associated with a second type of packet processing task;
forward the second data packet to a third processor of the multi-processor system assigned to process the second type of packet processing task; and
process the second type of packet processing task at the third processor by executing instructions out of a third private L1 cache at the third processor.

12. The non-transitory computer-readable storage medium of claim 8, wherein the program comprises further instructions executable to:

monitor a packet processing utilization level of each processor at the multi-processor system;
identify that the packet processing utilization level of an identified processor at the multi-processor system exceeds a packet processing threshold utilization level;
identify a packet processing task associated with the identified processor;
assign a third processor in the multi-processor system to process the packet processing task associated with the identified processor; and
filling at least a portion of a third private L1 cache at the third processor with program code, wherein the program code filling the at least portion of the third private L1 cache at the third processor includes instructions executable to process the identified packet processing task.

13. The non-transitory computer-readable storage medium of claim 12, wherein the program comprises further instructions executable to:
identify that a combined packet processing utilization level of the identified processor and the third processor is below a combined packet processing utilization threshold level; and
de-allocate the identified processor or the third processor from processing the identified packet processing task.

14. The non-transitory computer-readable storage medium of claim 9, wherein the program comprises further instructions executable to:
associate the third processor of the multi- processor system with processing the second type of packet processing task;
fill the at least portion of the second private L1 cache of the second processor with program code, wherein the program code filling the at least portion of the second private L1cache of the second processor includes instructions executable to process the first type of packet processing task; and
fill at least a portion of the third private L1 cache of the third processor with program code, wherein the program code filling the at least portion of the third private L1 cache of the third processor includes instructions executable to process the second type of packet processing task.

15. A system for optimizing performance of processing packets, the system comprising:
a plurality of processors, each comprising a level one (L1) cache, wherein the plurality of processors comprises:
a first processor that assigns one or more packet processing tasks to one or more of the other processors at the multi-processor system by executing a first set of program code stored in a first level 1 (L1) cache that is private to the first processor that includes instructions executable to assign packet processing tasks to one or more other processors of the plurality of processors based on a type of program code stored in respective private L1 caches of each of the one or more other processors; and
a second processor assigned by the first processor to process a first type of packet processing task of a plurality of different processing tasks, wherein the second processor comprises a second L1 cache that is private to the second processor and the second private L1 cache storing a second set of program code executable to process the first type of packet processing task; and
a data communication interface that receives a first data packet, wherein:

the first data packet is associated with the first type of packet processing task,
the first processor executes program code out of the first private L1 cache at the first processor to identify that the first data packet is associated with the first type of packet processing task, and forwards the first packet to the second processor, and
the second processor executes instructions out of the second private L1 cache at the second processor, wherein execution of the second private L1 cache instructions by the second processor processes the first type of packet processing task associated with the first data packet.

16. The system of claim 15, wherein the second processor forwards the first data packet to a third processor assigned to process a second type processing task and the third processor processes the second type of packet processing task by executing instructions out of a third private L1 cache at the third processor.

17. The system of claim 15, wherein the second processor forwards the first data packet to a fourth processor assigned to process a third type of packet processing task and the fourth processor processes the third type of packet processing task by executing instructions out of a fourth private L1 cache at the fourth processor.

18. The system of claim 15, wherein:
the network communication interface receives a second data packet;
the first processor executes instructions out of the first private L1 cache at the first processor to identify that the second data packet is associated with the first type of packet processing task, and forwards the second data packet to the second processor assigned to process the first type of processing task;
the second processor processes the first type of processing task by executing instructions out of the second private L1 cache at the second processor, and forwards the second data packet to a third processor assigned to process the second type of packet processing task; and
the third processor processes the second type of packet processing task by executing instructions out of a third private L1 cache at the third processor.

19. The system of claim 15, wherein at least one of the processors:
monitors a packet processing utilization level of each processor at the multi-processor system;
identifies that the packet processing utilization level of an identified processor at the multi-processor system exceeds a packet processing threshold utilization level;
identifies a packet processing task associated with the identified processor; and
assigns a third processor in the multi-processor system to process the identified packet processing task associated with the identified processor, wherein at least a portion of a third private L1 cache at the third processor is filled with program code, the program code filling the at least portion of the third private L1 cache at the third processor includes instructions executable to process the identified packet processing task associated with the identified processor.

20. The system of claim 19, wherein the at least one of the processors further:
identifies that a combined packet processing utilization level of the identified processor and the third processor is below a combined packet processing utilization threshold level; and de-allocates the identified processor or the third processor from processing the identified packet processing task.

* * * * *